United States Patent [19]

Hwang

[11] Patent Number: 4,930,720
[45] Date of Patent: Jun. 5, 1990

[54] CASSETTE LOADING DEVICE FOR VCR

[75] Inventor: Hak S. Hwang, Seoul, D.P.R. of Korea

[73] Assignee: Goldstar Co., Ltd., Seoul, D.P.R. of Korea

[21] Appl. No.: 244,410

[22] Filed: Sep. 14, 1988

[30] Foreign Application Priority Data

Sep. 15, 1987 [KP] D.P.R. of Korea ........... 15765/1987

[51] Int. Cl.$^5$ ............................................. G11B 15/32
[52] U.S. Cl. .................................. 242/198; 360/96.5; 360/96.6
[58] Field of Search ............................ 360/96.5, 96.6; 242/198, 199, 197

[56] References Cited

U.S. PATENT DOCUMENTS

| Re. 28,461 | 7/1975 | Lemelson | 235/61.11 |
|---|---|---|---|
| 4,087,839 | 5/1978 | Lemelson | 358/214 |
| 4,110,801 | 8/1978 | Lemelson | 360/96 |
| 4,385,332 | 5/1983 | Nakao et al. | 360/96.6 |
| 4,679,745 | 7/1987 | Kim | 242/75.4 |
| 4,692,823 | 9/1987 | Gwon | 360/85 |
| 4,729,500 | 3/1988 | Gwon | 226/190 |
| 4,730,792 | 3/1988 | Jang | 242/204 |
| 4,761,697 | 8/1988 | Hashiguchi et al. | 360/46.5 |
| 4,781,339 | 11/1988 | Ahn | 360/96.5 X |

Primary Examiner—Stuart S. Levy
Assistant Examiner—Paul Thomas Bowen
Attorney, Agent, or Firm—Birch, Stewart, Kolasch & Birch

[57] ABSTRACT

A cassette loading device for a VCR which comprises a drive gear meshed with a worm of a cassette loading unit, an up and down lever provided with a bent portion and lifting members, a driven pulley provided with jaws to which the driving force of the capstan motor is transmitted, a rotating member having jaws corresponding to the jaws of the driven pulley and a pressing coil spring interposed between the drive gear and the rotating member for transmitting the driving force of the capstan motor to the cassette loading unit. Thus the tape loading and driving functions can be performed by the use of only one capstan motor as a driving source thereby reducing the cost of manufacture of the device.

2 Claims, 6 Drawing Sheets

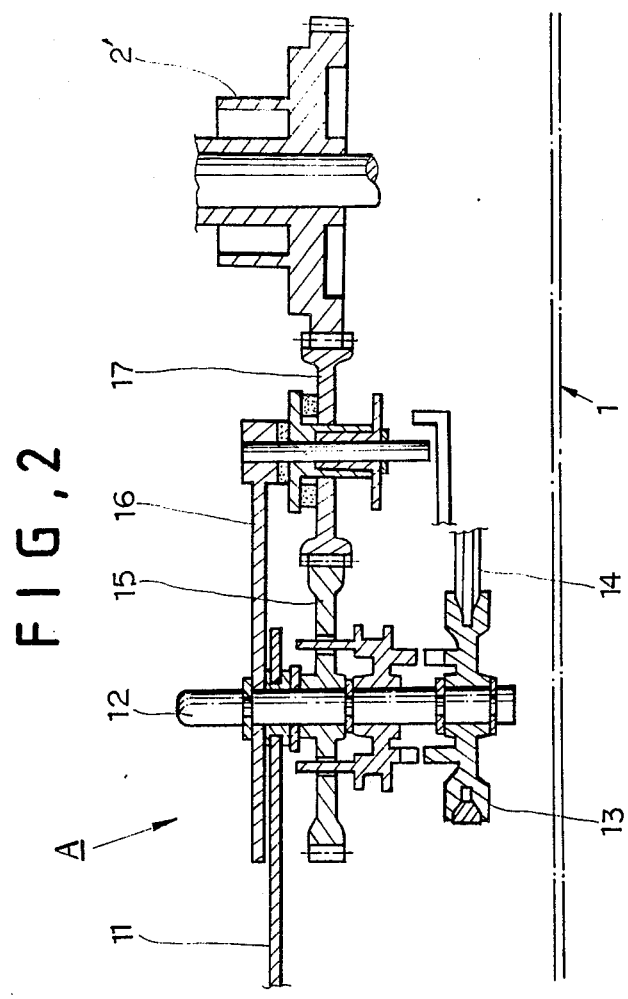

CASSETTE LOADING DEVICE FOR VCR

BACKGROUND OF THE INVENTION

The present invention relates to a cassette loading device for a VCR, more particularly to a cassette loading device which is designed to load and unload a tape cassette by use of the driving force of a capstan motor in a front loading type VCR.

In a conventional VCR, a motor for use in loading a cassette is required to transport the cassette to a specified loaded position for reproduction and recording, and a capstan motor is additionally utilized to run the tape by activating a capstan shaft, a supply reel and a take-up reel. Accordingly, there are some disadvantages in that the respective motors are required to activate the cassette and the tape, respectively, thus giving rise to a complicated structure of a VCR which impairs reduction in size and cost.

SUMMARY OF THE INVENTION

It is therefore an object of the present invention to obviate the above problems of the prior art apparatus. Another object of the present invention is to provide a cassette loading device which can drive the tape and load the cassette by common use of only one capstan motor as a driving source thereby reducing the cost of the product.

A further object of the present invention is accomplished by providing a driving force conversion unit between a capstan motor and a cassette loading unit, which is designed to connect the driving force of the capstan motor to the cassette loading unit in case of loading or ejecting of a cassette and to disconnect the driving force of the capstan motor from the cassette loading unit when the cassette loading operation is completed, thereby the capstan motor can be operated to perform its own function such as to run a tape in the PLAY mode.

The driving force conversion unit comprises a shaft disposed between a capstan motor and a worm of a cassette loading unit, a driven pulley having several jaws disposed on the upper surface thereof rotatably mounted at the lower portion of the shaft and interconnected with a lower pulley fixed to the lower end of a rotary shaft of the capstan motor through a belt, a drive gear provided with several pin holes and rotatably mounted at the upper portion of the shaft, a rotating member having several pins on the upper surface thereof and several jaws on the lower surface thereof disposed between the drive gear and the driven pulley, a pressing coil spring interposed between the rotating member and the drive gear, an up and down lever having a bent portion at one end thereof and a pair of lifting members at the other end thereof movably mounted on a fixing member fixed on a main chassis, and a slant guide member formed at an end of the function plate which is adapted to press the bent portion of the up and down lever when the driving force of the capstan motor is not to be transmitted to the cassette loading unit for the purpose of performing the activating of a supply reel or a take-up reel by the driving force of the capstan motor.

BRIEF DESCRIPTION OF THE DRAWINGS

The above and other objects, features and advantages of the present invention will become more apparent from the following detailed description in conjunction with the accompanying drawings, in which:

FIG. 2 is a cross-sectional view showing a speed conversion unit of FIG.1;

DETAILED DESCRIPTION OF THE INVENTION

Figure 1:
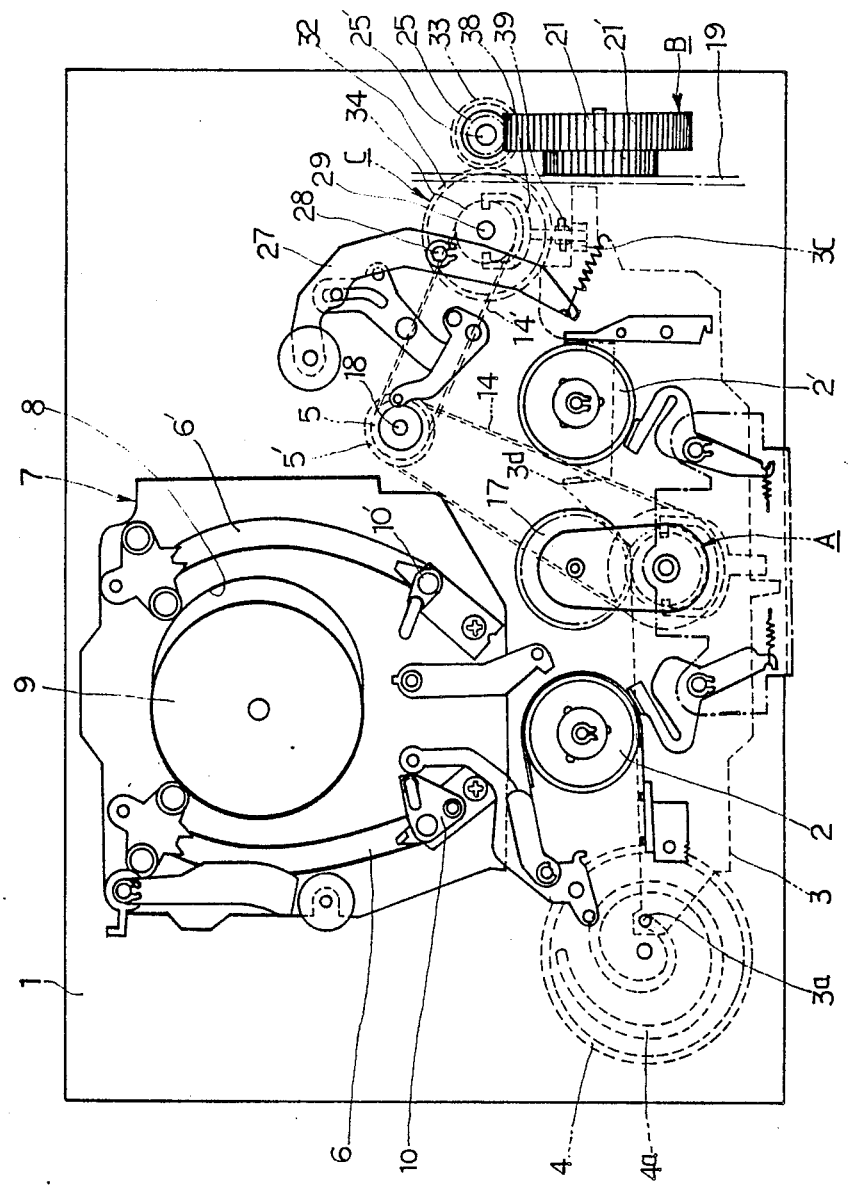
FIG. 1 is a plan view showing a deck mechanism of a VCR to which the cassette loading device of the present invention is pertained.

FIG. 1 shows a deck mechanism of a VCR embodying the cassette loading device of the present invention. As shown in FIG. 1, on the front of a main chassis 1, a supply reel 2 and a take-up reel 2' are rotatably mounted, and between said supply reel 2 and take-up reel 2', a speed conversion drive unit A which is adapted to selectively transmit the driving force of a capstan motor 5 thereto is disposed.

On the bottom of the main chassis 1, a function plate 3 having a connecting pin 3a on one end thereof and a cam gear 4 having a spiral cam groove 4a on one surface thereof are installed, respectively. The function plate 3 and the cam gear 4 are interlocked each other by the connecting pin 3a which is inserted into the cam groove 4a so that the function plate 3 can be moved in the left and right when the cam gear 4 rotates. The capstan motor 5 is also installed on the bottom of the main chassis 1, and a loading plate 7 having a pair of arcuate guide apertures 6,6' through which a pair of slant post assemblies 10, 10' are inserted, is mounted on the center of the main chassis 1.

At the center of said loading plate 7, a rotary head drum 9 is extruded through a center hole 8 formed on the center thereof. On one side of the main chassis 1, a cassette loading unit B is further installed, and between the capstan motor 5 and the cassette loading unit B a driving force conversion unit C is also disposed.

The driving force of the capstan motor 5 is selectively transmitted to the speed conversion drive unit A or the cassette loading unit B, and the driving force conversion unit C is constructed in a manner that it can transmit or cut-off the driving force of the capstan motor 5 to the cassette loading unit B.

FIG.2 shows the speed conversion drive unit A in detail.

In FIG. 2, the reference numeral 11 represents a base plate which is fixed on the main chassis 1 with a predetermined space, and 12 represents a shaft which is fixed to the base plate 11. At the lower portion of the shaft 12, a drive pulley 13 around which a belt 14 is wound, is fixed and at the upper portion thereof an output gear 15 and an idler lever 16 are fixed, respectively. The output gear 15 is meshed with an idler gear 17 which is fixed to one end of the idler lever 16 by an axis so that the idler gear 17 can engage selectively with the supply reel 2 or the take-up reel 2' according to the rotational direction of the drive pulley 13 when the driving force of the capstan motor 5 is transmitted to the drive pully 13 through the belt 14 and a pulley 5' fixed to a rotary shaft 18 of the capstan motor 5.

Figure 3A:
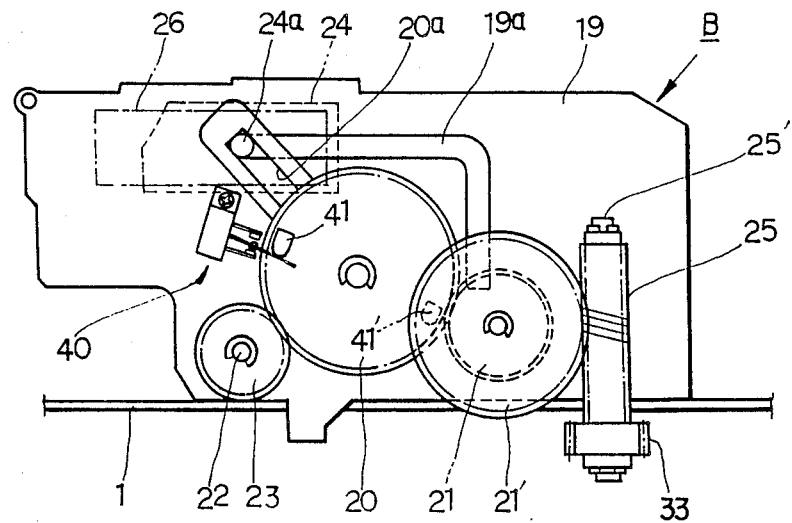
FIG. 3A is a side view showing a cassette loading unit when a cassette holder is not yet loaded.
Figure 3B:
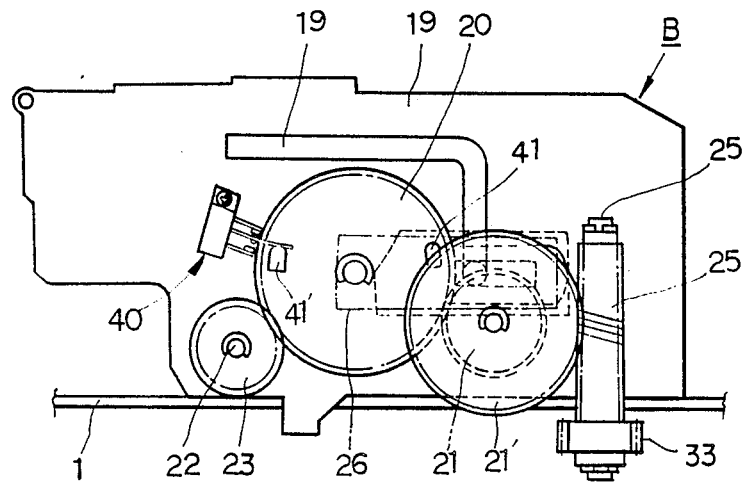
FIG. 3B is a side view of the cassette loading unit of FIG. 3A when the cassette holder is completely loaded.

FIG. 3 and 3B show the shows said cassette loading unit B in detail.

As shown in FIG. 3, a side wall plate 19 having a right-angled guide aperture 19a is mounted uprightly to the main chassis 1, and under the guide aperture 19a, an arm gear 20 having an extended guide groove 20a is rotatably mounted on the side plate 19. The arm gear 20 is engaged with a connecting gear 21 which is mounted coaxially with a worm gear 25' on the side plate 19. On the opposite side of the side plate 19, another side plate (not shown) is also mounted in parallel, and is provided with all the parts as the shown side plate 19.

The two plates 19 are interconnected each other by means of a connecting shaft 22 having a pair of drive gears 23 (only one is shown) at the outer ends therof. The drive gears 23 mesh with the arm gears 20. Between the side plates 19, a cassette holder 24 including a pair of guide pins 24a is disposed, and said guide pins 24a are inserted into the guide groove 20a of the arm gear 20 through the guide apertures 19a of the side plates 19, respectively.

On the side plate 19, a worm gear 21' is mounted coaxially with the connecting gear 21, and is engaged with a worm 25 rotatably mounted on a worm shaft 25' and is integrally provided on its outer end wth an upper gear 33 meshing with a drive gear 32 as shown in FIG. 1 and FIG. 4.

The cassette loading unit B described hereinabove operates as follows. When the capstan motor 5 rotates, the worm 25, the worm gear 21' meshing with the worm 25, the connecting gear 21 mounted coaxially with the worm gear 21', and the arm gear 20 meshing with the connecting gear 21 are consecutively rotated by means of the driving force of the capstan motor 5, and accordingly the cassette holder 24 in which the inserted cassette 26, is transported from an initial position as shown in FIG. 3A to a loaded position as shown in FIG. 3B. As a result, the cassette 26 inserted into the cassette holder 24 is loaded on the supply reel 2 and take-up reel 2'.

Figure 4A:
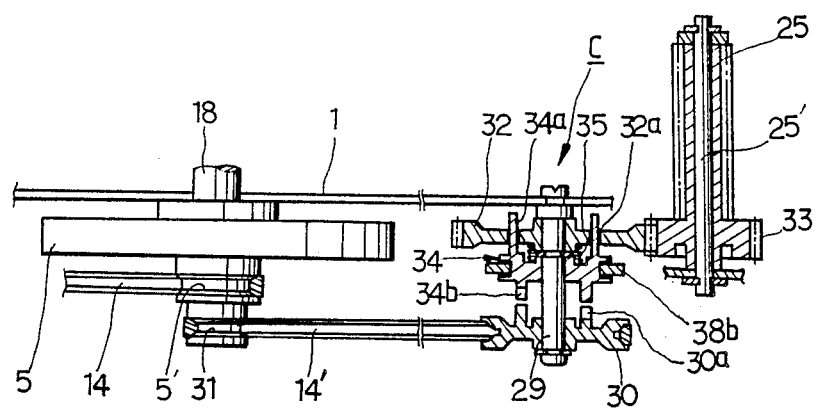
FIG. 4A is a cross-sectional view showing a driving force conversion unit when the driving force of the capstan motor is disconnected to a worm of the cassette loading unit.
Figure 4B:
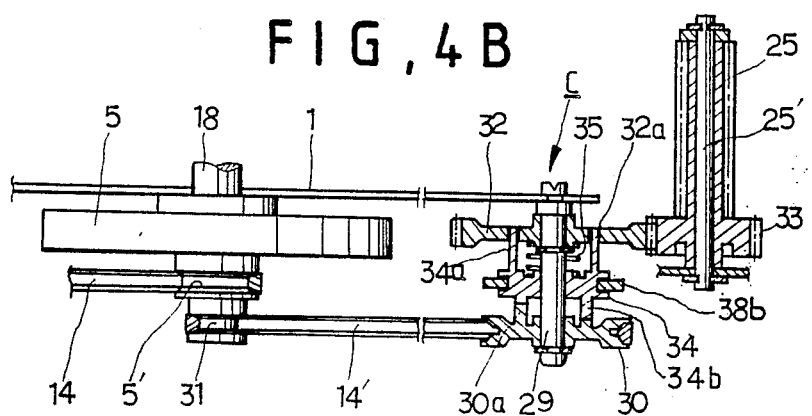
FIG. 4B is a cross-sectional view showing the driving force conversion unit when the driving force of the capstan motor is connected to the worm of the cassette loading unit.
Figure 5:
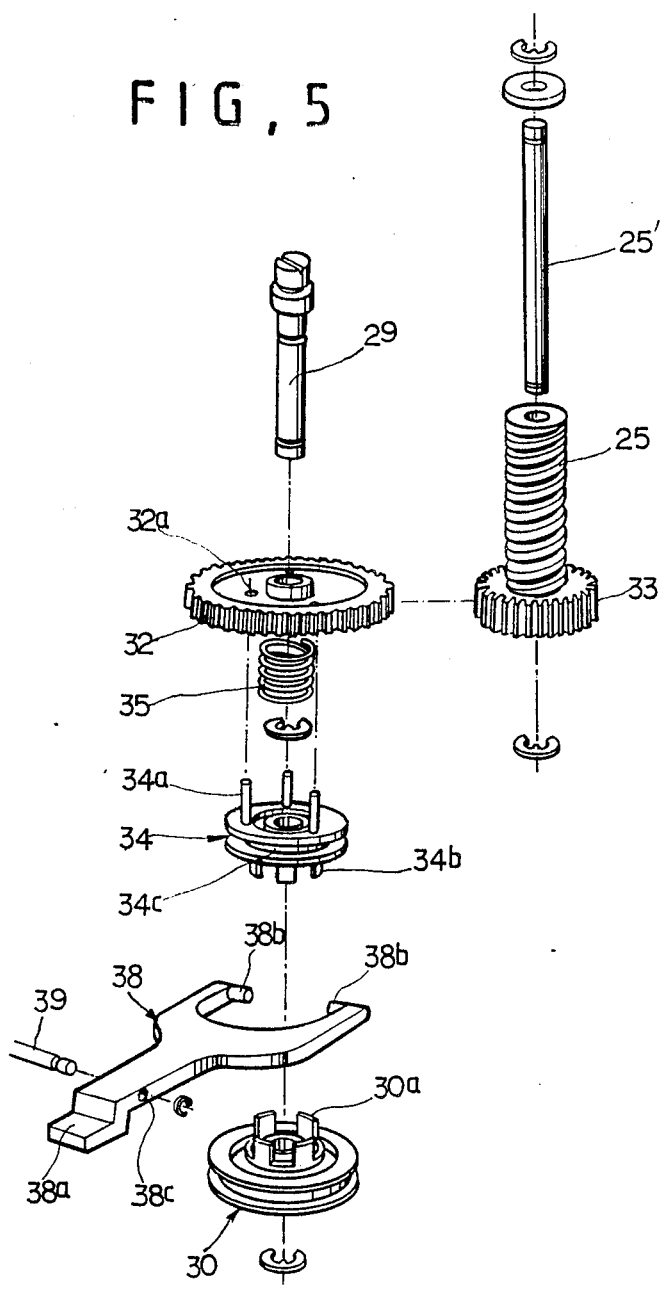
FIG. 5 is a exploded perspective view of the driving force conversion unit.
Figure 6:
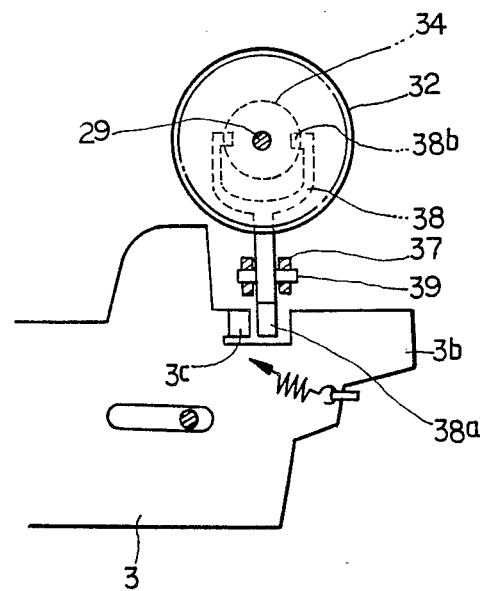
FIG. 6 is a plan view showing the driving force conversion unit and a function plate removed from a main chassis.

Referring now to FIGS. 4A and 4B showing the driving force conversion unit C for selectively transmitting the driving force of the capstan motor 5 to the cassette loading unit B or cutting-off therefrom . As shown in FIGS. 5, 6, and 7, at the lower end of a shaft 29 fixed on the main chassis 1, a driven pulley 30 having several jaws 30a on the surface thereof is rotatably mounted and is interconnected with a lower pulley 31 fixed to a rotary shaft 18 of the capstan motor 5 through a belt 14', and at the upper portion of the shaft 29 the drive gear 32 having pin holes 32a is also rotatably mounted so that the drive gear 32 meshes with the lower gear 33 integrally formed at the lower end of the worm 25. At the middle portion of the shaft 29, that is, between the driven pulley 30 and the drive gear 32 a rotating member 34 having several pins 34a on the upper surface thereof which are inserted into the pin holes 32a of the drive gear 32 is rotatably mounted. On the lower surface of the rotating member 34, several jaws 34b are projected to mesh with the jaws 30a of the driven pulley 30 when the driving force of the capstan motor 5 is to be transmitted to the worm 25 of the cassette loading unit B, and around the outer peripheral surface of the rotating member 34 a groove portion 34C having ⊔-shaped section is formed. Between the rotating member 34 and the drive gear 32, a pressing coil spring 35 is interposed, which is adapted to push downward the rotating member 34 so that the jaws 34b of the rotating member 34 and the jaws 30a of the driven pulley 30 can be meshed each other when the driving force of the capstan motor 5 is to be transmitted to the cassette loading unit B.

Furthermore, an up and down lever 38 having a downward bent portion 38a at one end thereof and a pair of lifting members 38b at the other end thereof is movably mounted on a fixing member 37 ( FIGS. 1 and 6) by means of an axial pin 39 inserted into a pin hole 38C formed at the middle portion of the up and down lever 38, and the lifting members 38b of the up and down lever 38 are engaged with the circular groove 34c of the rotating member 34.

In addition, on one end 3b of the function plate 3 positioned at the front of the up and down lever 38, a slant guide member 3c is integrally formed by slight bending thereof to be engaged with the bent portion 38a of the up and down lever 38 according to the movement of the function plate 3 thereby being effected the up and down movement of the up and down lever 38.

In FIG. 1, the reference numeral 3d represents a stopper for preventing the idler gear 17 of the speed conversion drive unit A from engagement with the take-up reel 2' when the cassette loading unit B is activated to load or unload the cassette 26.

In FIG. 3, the reference numeral 40 represents a switch for detecting the loading position, and 41, 41' represent opererative projections for bring the switch 40 into operation, respectively.

Figures 7A, 7B:
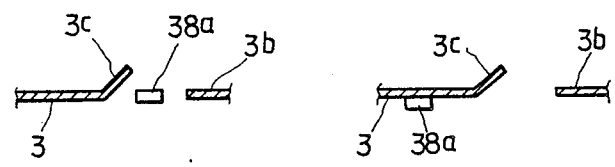
FIGS. 7A and 7B are partial cross-sectional views showing the operations of the function plate and an up and down lever.

The operation of the loading device of the present invention will now be described in detail. When Play, Cue, Rev, FF, or Rew mode is performed, the cam gear 4 is activated by a separate drive source (not shown) in the state of as shown in FIG. 1, FIG. 6 and FIG. 7A, and the function plate 3 interlocked with the cam gear 4 is moved in the right on the basis of FIG. 1, and accordingly the slant guide portion 3c of the function plate 3 presses the bent portion 38a of the up and down lever 38 so that the lifting members 38b are raised to move the rotating member 34 upwardly. Therefore, the jaws 34b of the rotating member 34 can be detached from the jaws 30a of the driven pulley 30 as shown in FIG. 4A. At this time, even though the capstan motor 5 is being rotated, the driving force thereof is not transmitted to the drive gear 32 so that the cassette loading unit B is not activated.

In the case where the jaws 30a of the driven pulley 30 and the jaws 34b of the rotating member 34 are detached each other, the driving force of the capstan motor 5 is transmitted to the speed conversion drive unit A through the belt 14, and thus the idler gear 17 of the speed conversion drive unit A enables the supply reel 2 or the take-up reel 2' to rotate, selectively.

On the other hand, when the cassette loading unit B is activated to load the cassette 26, the cam gear 4 is driven by a separate drive source (not shown) to move the function plate 3 from the position as shown in FIG. 7B to the position as shown in FIG. 1, FIG. 6, and FIG. 7A, the bent portion 38a of the up and down lever 38 is free from the pressing of the function plate 3 so that the rotating member 34 is moved downwardly from the position of FIG. 4A to that of FIG. 4B by means of the resilient force of the pressing coil spring 35, and accordingly the jaws 34b of the rotating member 34 are engaged with the jaws 30a of the driven pulley 30. Thereby the driving force of the capstan motor 5 can be transmitted to the cassette loading unit B.

In this state, when a user inserts the cassette 26 into the cassette holder 24 and pushes the cassette 26 as shown in FIG. 3A, the cassette holder 24 moves slightly according to the pushing force, and the operative projection 41 formed on the arm gear 20 becomes off from the switch 40 so that power is applied to the capstan motor 5 to rotate the capstan motor 5 in the clockwise direction. Therefore the lower pulley 31 fixed to the lower end of the rotary shaft 18 of the capstan motor 5 rotates, and the driving force thereof is transmitted to the lower gear 33 of the worm 25 through the belt 14', driven pulley 30, rotating member 34 and the drive gear 32, and then the worm gear 21', connecting gear 21 and arm gear 20 are rotated so that the cassette 26 is transported along with the cassette holder 24 to a loaded position horizontally and vertically as shown in FIG. 3B. This state of completion of cassette loading is detected by the operative projection 41' and the switch 40, respectively, and then the detected signal stops the capstan motor 5.

In the course of the cassette loading operation as described above, the driving force of the capstan motor 5 is transmitted to the idler gear 17 through the pulley 5', belt 14, drive pulley 13 and output gear 15, so that the idler gear 17 is swung in the direction of the take-up reel 2' to engage therewith. At this moment, since the stopper 3d of the funtion plate 3 is positioned between the idler gear 17 and the take-up reel 2' as shown in FIG. 6, the axis of the idler gear 17 is to be restrained its further movement by the stopper 3d, and thus the idler gear 17 is not engage with the take-up reel 2'.

On the other hand, when the cassette 26 is ejected in the state that the driving force of the capstan motor 5 is connected to the cassette loading unit B, the capstan motor 5 rotates in the counterclockwise direction so that the arm gear 20 is rotated in the counterclockwise direction, and thus the cassette holder 24 is moved from the loaded position as shown in FIG. 3B to the unloded position as shown in FIG. 3A in which the cassette 26 can be ejected therefrom.

At the same time, the idler gear 17 rotates the supply reel 2 in the counterclockwise direction, therefore loose tape can be wound around the supply reel 2 tightly.

As described above, the cassette loading device of the present invention is very advantageous in reducing the cost since the cassette loading and unloading operations are performed by use of only the driving force of the capstan motor without using any additional motor.

What is claimed is:

1. A cassette loading device for a VCR which comprises:
    a main chassis having an upper surface and a lower surface,
    a supply reel and a take-up reel rotatably mounted on the upper surface of the main chassis,
    a capstan motor disposed on the lower surface of said main chassis for driving said supply reel and take-up reel,
    a cassette loading unit disposed on one side of the upper surface of said main chassis
    for loading a cassette and being adapted to selectively transmit the driving force of the capstan motor, and
    a function plate disposed on the one side of the lower surface of said main chassis
    said function plate interlocked with a cam gear disposed on the lower surface of said main chassis and a driving force conversion unit for selectively connecting the force of the capstan motor to the cassette loading unit, said driving force conversion unit including:
    a shaft disposed between said capstan motor and a worm of said cassette loading unit,
    a driven pulley having jaws disposed on the upper portion of said driven pulley , said driven pulley being rotatably mounted at the lower portion of said shaft and interconnected with a lower pulley which is fixed to the lower end of a rotatory shaft of said capstan motor through a belt,
    a drive gear provided with pin holes and rotatably mounted at the upper portion of said shaft,
    a rotating member having pins disposed on the upper portion of said rotating member and jaws disposed on the lower portion of said rotating member thereof and disposed between said drive gear and said driven pulley,
    a pressing coil spring interposed between said rotating member and said drive gear, and
    an up and down lever having a bent portion disposed at one end thereof and a pair of lifting members disposed at the other end of said up and down lever, said up and down lever movably mounted on a fixing member fixed on the main chassis, said lifting members engaged with a circular groove formed on the outer peripheral surface of said rotating member and adapted to separate said rotating member having said driven pulley and a slant guide member formed at one end of said function plate which is adapted to press said bent portion of said up and down lever, whereby the cassette loading device effectively loads and unloads a tape cassette by utilizing the driving force of the capstan motor.

2. The cassette loading device as claimed in claim 1, wherein the driving force of the capstan motor is connected or disconnected to the cassette loading unit in response to up and down movement of the up and down lever.

* * * * *

UNITED STATES PATENT AND TRADEMARK OFFICE
CERTIFICATE OF CORRECTION

PATENT NO. : 4,930,720
DATED     : June 5, 1990
INVENTOR(S) : Hak Sun HWANG

It is certified that error appears in the above-identified patent and that said Letters Patent is hereby corrected as shown below:

On the title page:

In category "[21] Appl. No.:", please change "244,410" to --244,416--.

Signed and Sealed this

Twenty-seventh Day of August, 1991

Attest:

HARRY F. MANBECK, JR.

Attesting Officer

Commissioner of Patents and Trademarks